United States Patent
Joo

(10) Patent No.: US 8,761,836 B2
(45) Date of Patent: Jun. 24, 2014

(54) MOBILE TERMINAL

(75) Inventor: Won Seok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 410 days.

(21) Appl. No.: 13/029,624

(22) Filed: Feb. 17, 2011

(65) Prior Publication Data

US 2011/0287812 A1     Nov. 24, 2011

(30) Foreign Application Priority Data

May 19, 2010    (KR) .................... 10-2010-0046990

(51) Int. Cl.
*H04M 1/38* (2006.01)

(52) U.S. Cl.
USPC ......... 455/566; 206/305; 455/41.3; 455/90.3; 455/556.1; 455/575.1

(58) Field of Classification Search
CPC .............. G06F 3/041; G06F 1/1626; G06F 2203/04103; G06F 3/016; H04M 1/0266; H04M 1/0268; H04M 1/185; H04M 1/0202; H04M 1/0249; H04W 88/02; H01L 27/323; H01Q 1/243; H05K 1/147
USPC ............. 206/305; 455/41.3, 90.3, 556.1, 566, 455/575.1
See application file for complete search history.

(56) References Cited

U.S. PATENT DOCUMENTS

| | | | |
|---|---|---|---|
| 2009/0205983 A1* | 8/2009 | Estlander | 206/305 |
| 2009/0247236 A1 | 10/2009 | Kajiwara et al. | |
| 2010/0112949 A1* | 5/2010 | Kim et al. | 455/41.3 |
| 2011/0164370 A1* | 7/2011 | McClure et al. | 361/679.26 |

FOREIGN PATENT DOCUMENTS

| | | |
|---|---|---|
| CN | 1498021 | 5/2004 |
| EP | 1919267 | 5/2008 |
| EP | 2071909 | 6/2009 |

OTHER PUBLICATIONS

The State Intellectual Property Office of the People's Republic of China Application Serial No. 201110079183.7, Office Action dated Aug. 21, 2013, 7 pages.
European Patent Office Application Serial No. 10015525.8, Search Report dated Feb. 24, 2014, 6 pages.

* cited by examiner

*Primary Examiner* — Edward Urban
*Assistant Examiner* — Max Mathew
(74) *Attorney, Agent, or Firm* — Lee, Hong, Degerman, Kang & Waimey

(57) ABSTRACT

A mobile terminal is disclosed, by which a user is facilitated to carry and use a terminal in a simple and easy way. The present invention includes a display unit, a window provided over the display unit, the window made of an optically transmittive material, and at least one metal frame attached to an edge of a backside of the window. Accordingly, the present invention sufficiently secures bending rigidity in a vertical length direction of a window, reinforcing a locking power between the window and a case, and enhancing the beauty of an exterior by removing a gap between the window and the case.

15 Claims, 18 Drawing Sheets

(a)

(b)

(a)

(b)

(a)

(b)

(a)

(b)

(c)

(a)

(b)

(a)

(b)

(a)

(b)

(a)

(b)

(a)

(b)

(a)

(b)

MOBILE TERMINAL

Pursuant to 35 U.S.C. §119(a), this application claims the benefit of earlier filing date and right of priority to Korean Application No. 10-2010-0046990, filed on May 19, 2010, the contents of which are hereby incorporated by reference herein in their entirety.

BACKGROUND OF THE INVENTION

1. Field of the Invention

The present invention relates to a mobile terminal, and more particularly, a mobile terminal for facilitating a user to carry and use a terminal in a simple and easy way. Although the present invention is suitable for a wide scope of applications, it is particularly suitable for sufficiently securing a bending strength in a vertical length direction of a window, reinforcing a locked force between the window and a case, and enhancing beauty of exterior by eliminating a gap between the window and the case.

2. Discussion of the Related Art

Generally, terminals can be classified into mobile terminals and stationary terminals according to a presence or non-presence of mobility. And, the mobile terminals can be further classified into handheld terminals and vehicle mount terminals according to availability for hand-carry.

As functions of the terminal tend to be diversified, the terminal is implemented as a multimedia player type equipped with composite functions including picture or video photographing, music or video file playback, games, broadcast reception and the like for example.

Recently, a mobile terminal absorbs function of independent multimedia devices and its unique field is ongoing to dilute.

Generally, a mobile terminal having a communication function can be classified into one of a bar type (e.g., a full touch screen type, etc.), a folder type, a slide type and the like.

The above-configured mobile terminal generally includes a display unit for displaying an image and is also provided with a window configured to cover the display unit to protect and a bezel part configured to enclose an edge of the window.

Recently, as many efforts for increasing a size of a display unit provided to a mobile terminal are ongoing, a size of a window for shielding and protecting the display unit tend to increase gradually. Moreover, in order to downsize a mobile terminal, many attempts are continuously made to minimize a thickness of a window while a size of a display unit is raised.

Generally, a window is made of a glass material. As mentioned in the foregoing description, as the thickness of the window tends to decrease despite increasing a size of the window, if a bending moment is applied to a mobile terminal, it may easily cause transformation or damage to the mobile terminal.

Recently, efforts for minimizing a width of a bezel part are ongoing to downsize a mobile terminal.

In this case, the bezel part is attached to a window using an adhesive agent or a double-sided tape. As mentioned in the foregoing description, if a width of the bezel part decreases, an area for the bezel part to be attached to the window decreases as well. Therefore, it may degrade an adhesive power between the window and the bezel part.

Furthermore, the attachment of the bezel part using the adhesive agent or the double-sided tape eventually generates a minute gap between the window and the bezel part. If an attached face between the bezel part and the window is externally exposed, it may degrade the exterior beauty of the mobile terminal.

SUMMARY OF THE INVENTION

Accordingly, the present invention is directed to a mobile terminal that substantially obviates one or more problems due to limitations and disadvantages of the related art.

An object of the present invention is to provide a mobile terminal, by which such a transformation or damage as a bending due to a bending moment working on a window and the like can be prevented in a manner of securing a bending strength for the window.

Another object of the present invention is to provide a mobile terminal, by which a locking force between a window and a member combined with an edge of the window can be enhanced.

A further object of the present invention is to provide a mobile terminal, by which the exterior beauty of the mobile terminal can be enhanced in a manner of removing a gap between a window and a member combined with an edge of the window.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display unit, a window provided over the display unit, the window made of an optically transmittive material, and at least one metal frame attached to an edge of a backside of the window.

Preferably, the mobile terminal further includes an injection frame combined with a lateral side of the window and the at least one metal frame and the injection frame is formed by insert injection molding.

More preferably, the metal frame includes an accommodating part configured to accommodate a portion of an injection material forming the injection frame therein.

More preferably, at least one fixing hole is provided to the metal frame and a portion of an injection material forming the injection frame is formed by penetrating the at least one fixing hole.

Preferably, the mobile terminal further includes an injection frame combined with a lateral side of the window and the at least one metal frame and the injection frame is attached to the at least one metal frame via an adhesive agent.

More preferably, a recess to a predetermined depth is formed at one face of the metal frame attached to the injection frame.

More preferably, a perforated hole is formed at one face of the metal frame attached to the injection frame.

Preferably, the mobile terminal further includes an injection frame combined with a lateral side of the window and the at least one metal frame and the injection frame is attached to the at least one metal frame via an adhesive tape.

More preferably, a ring type projection configured to be projected toward the metal frame is provided to the injection frame and a locking hole configured to have the projection of the injection frame locked therein is provided to the metal frame.

Preferably, the mobile terminal further includes an injection frame combined with a lateral side of the window and the at least one metal frame. And, the injection frame includes a case configured to form an exterior of the mobile terminal together with the window.

Preferably, the mobile terminal further includes an injection frame combined with a lateral side of the window and the at least one metal frame and a case made of a metal material configured to form an exterior of the mobile terminal. In this case, the injection frame is inserted between the window and the case.

Preferably, the at least one metal frame is attached to an edge of a backside of the window via an adhesive agent.

More preferably, a recess to a predetermined depth is formed at one face of the metal frame attached to the window.

More preferably, a perforated hole is formed at one face of the metal frame attached to the window.

Preferably, the mobile terminal further includes a plurality of metal frames configured to be attached to left and right edges of a backside of the window.

Preferably, the metal frame has a shape bent along the edge of the window.

Preferably, one end of the metal frame is projected outside one side of the window.

Preferably, the metal frame includes a bent part bent at least once in a width direction of the metal frame, at least one layer of a reinforcing frame made of a same metal of the metal frame is stacked on the metal frame, and a topside of the reinforcing frame and an edge of a backside of the window are attached to each other via an adhesive agent.

In another aspect of the present invention, a mobile terminal includes a window provided made of an optically transmittive material, at least one metal frame provided to a backside of the window to provide rigidity to the window, and an injection frame combined with a lateral side of the window and the at least one metal frame.

Preferably, the injection frame is formed by insert injection molding.

Accordingly, since a metal frame is attached to an edge of a backside of a window, a mobile terminal according to the present invention is able to sufficiently secure a rigidity for a bending moment.

And, a window and a bezel part can be strongly locked with each other despite a narrow bezel part.

Moreover, a window, a metal frame and a bezel part are formed in one body by insert injection molding, there is no gap between the window and the bezel part. Therefore, the exterior beauty of the mobile terminal can be enhanced.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 11(a)-10(b) are partially cross-sectional diagrams of a mobile terminal according to another embodiment of the present invention;

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
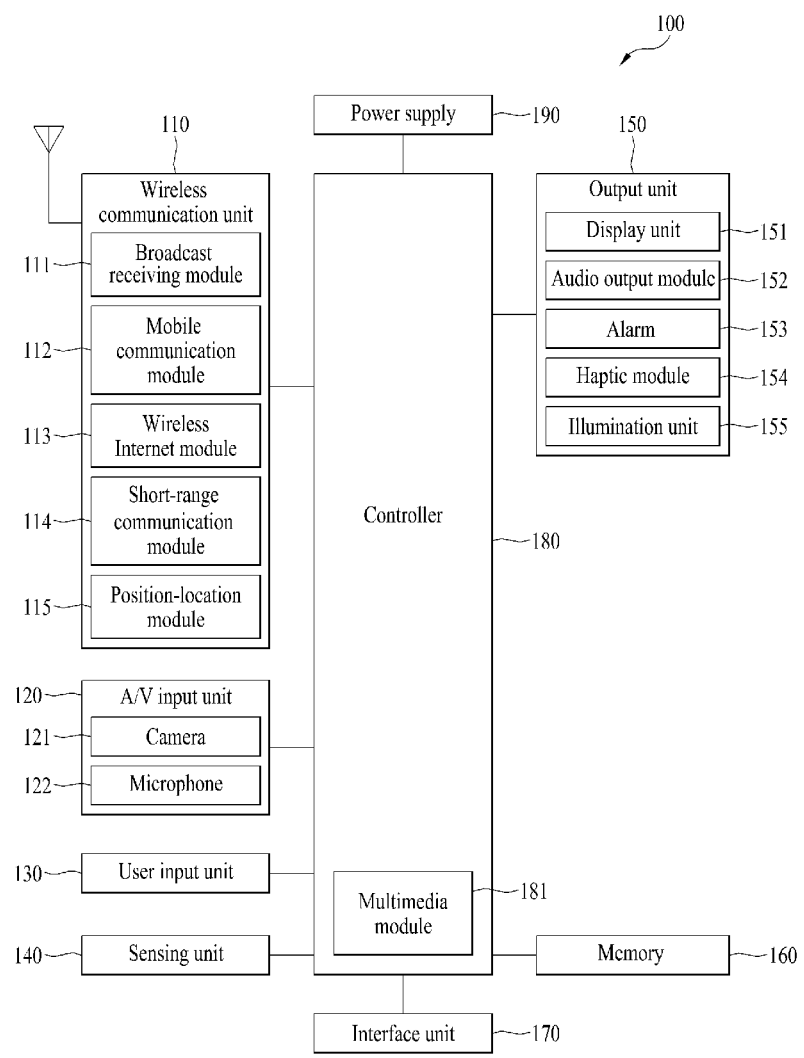
FIG. 1 is a block diagram of a mobile terminal according to an embodiment of the present invention.

FIG. 1 is a block diagram of a mobile terminal 100 in accordance with an embodiment of the present invention.

FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal.

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Meanwhile, the A/V (audio/video) input unit 120 is configured to input an audio signal or a video signal and can include a camera module 121, a microphone module 122 and the like. The camera module 121 processes an image frame of a still or moving picture obtained by an image sensor in a video call mode or a photographing mode. And, the processed image frame can be displayed on the display 151.

The image frame processed by the camera module 121 is stored in the memory 160 or can be externally transmitted via the wireless communication unit 110. At least two camera modules 121 can be provided according to a configuration type of the terminal.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

The sensing unit 140 detects such a current configuration of the mobile terminal 100 as an open/closed configuration of the mobile terminal 100, a location of the mobile terminal 100, a presence or non-presence of user contact and the like and then generates a sensing signal for controlling an operation of the mobile terminal 100.

For instance, if the mobile terminal 100 is a slide phone type, the sensing unit 140 is able to sense whether a slide phone is open or closed. And, the sensing unit 140 is responsible for sensing functions related to a presence or non-presence of power supply of the power supply 190, an external device loading of the interface unit 170 and the like.

The output unit 150 is configured to output an audio signal, a video signal and/or an alarm signal. And, the output unit 150 can include the display 151, an audio output module 152, an alarm output module 153, a haptic module 154, an illuminating unit 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays. For instance, an external display (not shown in the drawing) and an internal display (not shown in the drawing) can be simultaneously provided to the mobile terminal 100.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The illuminating unit 155 can be provided for various kinds of illumination effects of the mobile terminal. For instance, a mobile terminal recently tends to provide an illumination function to a user input unit and the like. For this, the illuminating unit 155 can be provided in addition to a backlight of the display unit 151.

The memory 160 can store programs for the processing and control of the controller 180 and is also able to perform a function for temporary storage of inputted/outputted data (e.g., phonebook data, message data, still picture data, moving picture data, etc.). Moreover, the memory 160 can store data of various patterns of vibration and sound outputted in case of the touch input to the touchscreen.

The memory 160 can include at least one storage medium of such a type as a flash memory type, a hard disk type, a multimedia card micro type, a card type memory (e.g., SD memory, XD memory, etc.), RAM and ROM. Moreover, the mobile terminal 100 is able to operate a web storage that performs a storage function of the memory 160 on internet.

The interface unit 170 plays a role as an interface with every external device connected to the mobile terminal 100. For instance, the external devices include a wire/wireless headset, an external electricity charger, a wire/wireless data port, a card socket (e.g., memory card socket, SIM/UIM card socket, etc.), audio I/O (input/output) terminals, video I/O (input/output) terminals, earphones, etc. The interface unit 170 receives data from the external device or is supplied with power. The interface unit 170 then delivers the received data or the supplied power to the corresponding component within the mobile terminal 100 or transmits data within the portable terminal 100 to the corresponding external device.

The controller 180 normally controls overall operations of the mobile terminal 100. For instance, the controller 180 performs the control and processing related to speech call, data communication, video call and the like. And, the controller 180 can be provided with a multimedia play module 181 for multimedia playback as well. The multimedia playback module 180 can be configured as hardware within the controller 180 or software separate from the controller 180.

The power supply 190 receives an external and/or internal power source and then supplies power required for operations of the respective components, under the control of the controller 180.

In the above description, the mobile terminal according to the present invention is explained in aspect of components according to functionality. In the following description, the mobile terminal according to the present invention is further described in aspect of components according to an exterior.

For clarity of the following description, a mobile terminal of a slider type selected from a folder type, a bar type, a swing type, a slide type and the like is described for example. Therefore, the present invention is non-limited by the mobile terminal of slider type but is applicable to mobile terminals of all types including the above-mentioned types.

Figure 2:
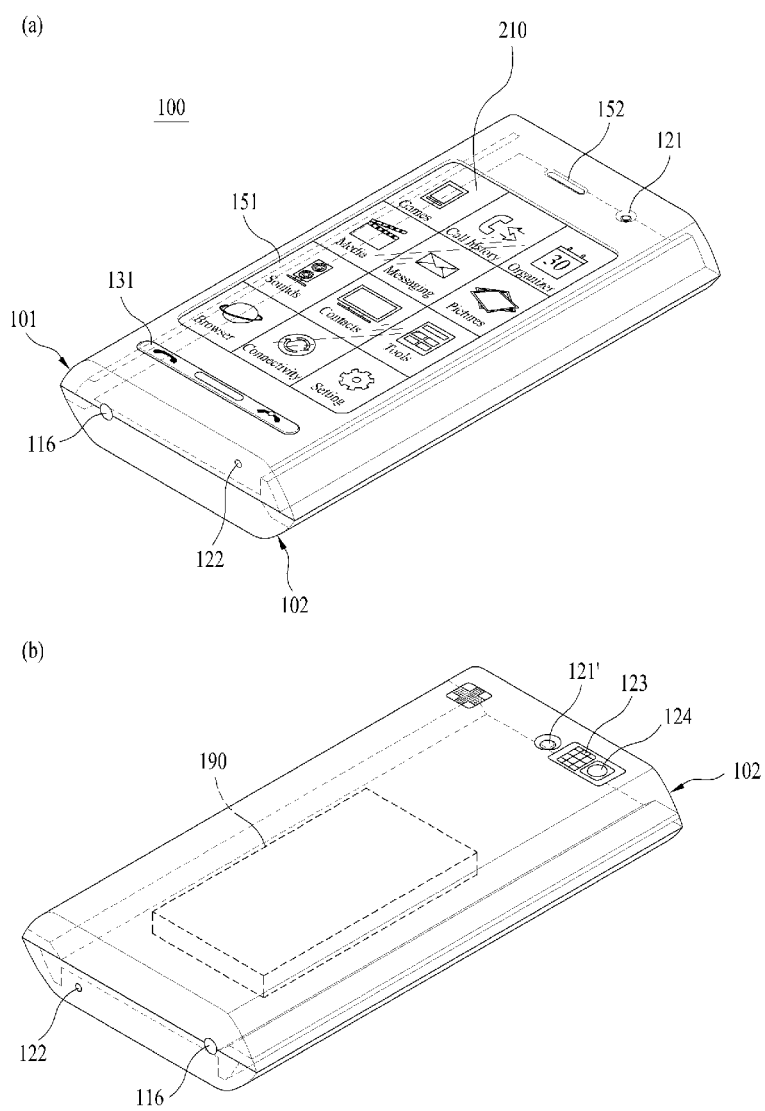
FIGS. 2(a)-2(b) are perspective diagrams of a mobile terminal according to one embodiment of the present invention.

FIG. 2 is a perspective diagram of a mobile terminal according to the present invention. In particular, FIG. 2 (*a*) is a front perspective view of a mobile terminal according to one example of a mobile terminal according to the present invention. FIG. 2 (b) is a backside perspective view of the mobile terminal shown in FIG. 2 (a).

The mobile terminal 100 shown in FIG. 2 (a) has a terminal body of a bar type.

Referring to FIG. 2 (a), according to the present embodiment, a case configuring an exterior of a body can be divided into a front case 101 and a rear case 102. Various electric/electronic parts are loaded in a space provided between the front and rear cases 101 and 102. Optionally, at least one middle housing can be further provided between the front and rear cases 101 and 102 in addition.

The cases forming the exterior of the body of the mobile terminal are formed by injection molding of synthetic resin or can be made of metal substance such as stainless steel (STS), titanium (Ti) or the like for example.

At least one edge part of the front case 101 and/or the rear case 102 is rounded or bent with a slope. FIG. 2 shows that both edge parts of the front and rear cases 101 and 102 are rounded, by which the present invention is non-limited. Thus, if the edge part of the case is rounded, a user's touch of a grip is enhanced and the sense of beauty can be provided different from that of an angulated edge part.

An audio output unit 152, a camera 121, a user input unit 131, a microphone 122 and the like can be provided to the front case 101 of the mobile terminal body.

The user input unit 131 is manipulated to receive an input of a command for controlling an operation of the terminal 100. And, the input unit 131 is able to include a plurality of manipulating units. The user input unit can adopt any mechanism of a tactile manner that enables a user to perform a manipulating action by experiencing a tactile touch.

Contents inputted by the user input unit 131 can be diversely set.

Meanwhile, a window 210 can be provided to a center of the front case 101 to configure an exterior of the mobile terminal 100 together with the front case 101. In particular, an opening is formed at the center of the front case 101. And, the window 210 is situated at the opening to form a front side of the mobile terminal 100.

A display unit 151 can be provided under the window 210 to display and output information processed by the mobile terminal 100. According to the present embodiment, the window 210 plays a role in enabling a user to view contents displayed on the display unit 151 via the window 210 while shielding and protecting the display unit 151. Yet, the window 210 needs not to be regarded as a sort of a component separate from the display unit 151. For instance, the window 151 can be substantially formed in one body of the display unit 151.

Meanwhile, at least one metal frame (not shown in the drawing) can be attached to an edge of a backside of the window 210. This shall be explained in detail later in this disclosure.

FIG. 2 (b) is a perspective diagram of a backside of the terminal shown in FIG. 2 (a).

Referring to FIG. 2 (b), a camera 121' can be additionally provided to a backside of the terminal body, and more particularly, to the rear case 102. The camera 121 has a photographing direction that is substantially opposite to that of the former camera 121 shown in FIG. 2 (a) and may have pixels differing from those of the former camera 121.

Preferably, for instance, the former camera 121 has low pixels enough to take and transmit a picture of user's face for a video call, while the latter camera 121' has high pixels for capturing a general subject for photography without transmitting the captured subject. And, each of the cameras 121 and 121' can be installed at the terminal body to be rotatable or popped up.

A flash 123 and a mirror 124 are additionally provided in the vicinity of the camera 121'. The flash 123 projects light toward a subject in case of photographing the subject using the camera 121'. In case that a user attempts to take a picture of the user (self-photographing) using the camera 121', the mirror 124 enables the user to view user's face reflected by the mirror 124.

An additional audio output unit (not shown in the drawing) can be provided to the backside of the terminal body. The additional audio output unit (not shown in the drawing) is able to implement a stereo function together with the former audio output unit 152 shown in FIG. 2 (a) and may be used for implementation of a speakerphone mode in talking over the terminal.

A broadcast signal receiving antenna (not shown in the drawing) can be additionally provided to the lateral side of or within the mobile terminal body as well as an antenna for communication or the like.

A power supply unit 190 for supplying a power to the mobile terminal 100 is loaded on the mobile terminal body. And, the power supply unit 190 can be configured to be built within the terminal body. Alternatively, the power supply unit 190 can be configured to be detachably connected to the terminal body.

In the following description, a mobile terminal according to one embodiment of the present invention is explained in detail with reference to FIG. 3 and FIG. 4.

Figure 3:
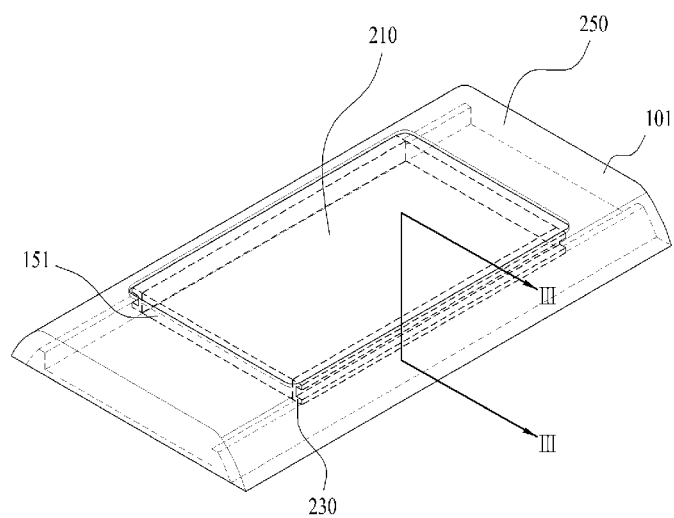
FIG. 3 is a partially perspective diagram of a mobile terminal according to one embodiment of the present invention.

FIG. 3 is a partially perspective diagram of a mobile terminal according to one embodiment of the present invention. And, FIG. 4 is a partially exploded perspective diagram of a mobile terminal according to one embodiment of the present invention.

Figure 4:
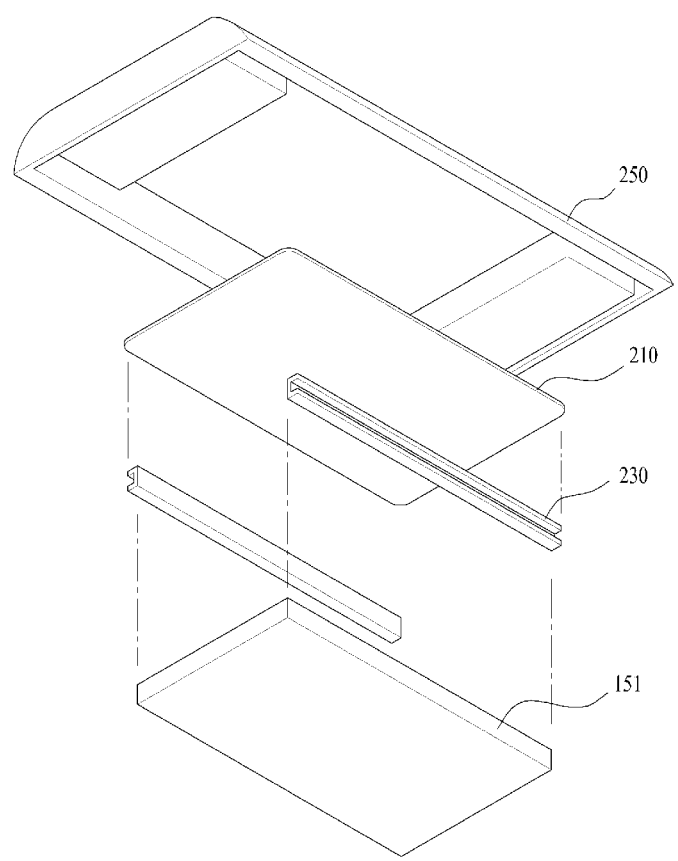
FIG. 4 is an exploded perspective diagram of a mobile terminal according to one embodiment of the present invention.

In particular, FIG. 3 and FIG. 4 show components situated over the rear case 102 in the mobile terminal 100 shown in FIG. 2 (a). For clarity of the following description, the components including the audio output unit 152, the camera 121, the user input unit 131, the microphone 122 and the like are omitted from the corresponding drawings.

Referring to FIG. 3 and FIG. 4, a mobile terminal 100 according to the present invention includes a display unit 151, a window 210 provided over the display unit 151, the window made of an optically transmittive material, and at least one metal frame 230 attached to an edge of a backside of the window 210.

And, the mobile terminal 100 is able to further include an injection frame 250 attached to a lateral side of the window 210 and the at least one metal frame 230.

The injection frame 250 can include a case forming an exterior of the mobile terminal 100, as will be mentioned in the following description, or a member configuring to load the window 210 on a specific position within the mobile terminal 100 by supporting the window 210. FIG. 3 and FIG. 4 show that the injection frame 250 includes the case 101 or 102, and more particularly, the front case 101.

As the window 210 is made of the optically transmittive material and is provided over the display unit 151, a user is able to check a content displayed on the display unit 151 via the window 210.

Moreover, to the edge of the backside of the window 210, as shown in FIG. 3 and FIG. 4, at least one metal frame 230 can be attached to prevent the bending transformation of the window 210 and to enhance a locking force with the injection frame 250. A shape of the metal frame 230, an attaching method and the like shall be explained in detail later.

Meanwhile, the display unit 151 can be provided under the window 210, as shown in FIG. 3 and FIG. 4. The display unit 151 is provided in a manner of being brought into contact with a backside of the window 210 or can be provided under the window 210 in a manner of being spaced apart from the window 210 in a prescribed distance. In case that the display unit 151 is provided in a manner of being brought into contact with the backside of the window 210, the display unit 151 is preferably formed more or less smaller than the window 210 to avoid interfering with the metal frame 230 attached to the edge of the backside of the window 210.

As mentioned in the foregoing description, the display unit 151 is non-limited as the component separate from the window 210. For instance, the display unit 210 can be substantially built in one body of the window 210. In this case, the window 210 of an embodiment explained in the following description can be regarded as the display unit 151.

The projection frame 250 is combined with the lateral sides (i.e., top, bottom, left and right sides) of the window 210 and the metal frame 230 to form an exterior of the mobile terminal 100 or to be loaded within the mobile terminal 100. FIG. 3 and FIG. 4 show that the projection frame 250 includes the case forming the exterior of the mobile terminal 100 together with the window 210. Thus, if the injection frame 250 forms the exterior of the mobile terminal 100, it can be called a bezel part.

Various embodiments of a mobile terminal according to the present invention are described in detail with reference to FIG. 5 and the like as follows. For clarity of the following description, the display unit 151 is not shown in the drawings FIG. 5 and the like.

Figure 5:
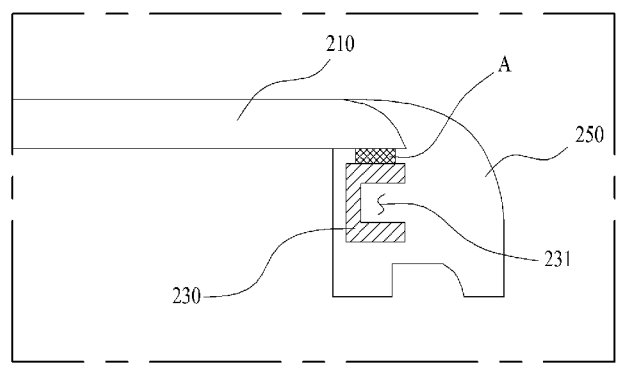
FIG. 5 is a cross-sectional diagram of the mobile terminal shown in FIG. 3 along a cutting line III-III.

FIG. 5 is a cross-sectional diagram of the mobile terminal shown in FIG. 3 along a cutting line III-III.

Referring to FIG. 5, a mobile terminal 100 according to the present embodiment includes a window 210 made of an optically transmittive material, at least one metal frame 230 attached to an edge of a backside of the window, and an injection frame 250 combined with a lateral side of the window 210 and the metal frame 230.

In this case, a type of the material for the window 210 can include an optically transmittive material of any type. Generally, the optically transmittive material includes glass. Alternatively, the optically transmittive material can include a random synthetic transparent material such as synthetic sapphire. Preferably, the window 210 can be made of a tempered glass material.

In this case, the tempered glass the glass tempered in a manner of heating a plate glass at a temperature close to a softening temperature, rapidly cooling down the heated glass to compressively transform an outer part of the glass and to tensiley transform an inner part of the glass. The tempered glass manufactured in this manner has shock resistance and heat-resistance better than those of a normal glass. And, a bending strength is 3 to 5 times higher than that of the normal glass.

Thus, if the window 210 is made of the tempered glass material, transformation due to the bending moment can become smaller than that of the normal glass. Yet, a compressive stress is formed on a surface of the tempered glass to sustain external weight and a tensile stress is formed within the tempered glass. Hence, if an external force greater than a bending strength of the tempered glass is applied to the tempered glass, it may be dangerously shattered. This can be compared to the case of the normal glass. In particular, if an external force greater than a bending strength of the normal glass is applied to the normal glass, the normal glass may crack. Moreover, the cracked glass my further broken into several pieces.

Therefore, in case of using the tempered glass as the material of the window 210, a considerable bending strength is required for the safety and durability enhancement. In this case, the mobile terminal 100 according to the present invention secures the rigidity of the window 210 in a manner of attaching at least one or more metal frames 230 to the edge of the backside of the window 210. FIG. 5 shows that the metal frame 230 is attached to the window 210 via an adhesive agent A.

Moreover, the metal frame 230 attached to the backside of the window 210 can also play a role in reinforcing a locking power between the injection frame 250 and the window 210. This shall be explained in detail later in this disclosure.

Meanwhile, the injection frame 250 shown in FIG. 5 is the case that forms an exterior of the mobile terminal 100 together with the window 210. In particular, the injection frame 250 is formed by insert injection molding.

In more particular, the injection frame 250 is formed by the insert injection molding in a manner of inserting the window 210 having the metal frame 230 attached thereto into a mold and then enabling a lateral side 9 i.e., edge) of the window 210 and the metal frame 230 to be enclosed by the mold. In order to form the injection frame 250 by injection molding, materials injected into the mold can include such plastics as polycarbonate, ABS and the like or such ceramics as alumina, zirconia and the like.

Thus, since the injection frame 250 is formed by the insert injection molding in a manner of injecting a melted injection material around the lateral side of the window 210 and the metal frame 230, which are inserted into the mold, and then solidifying the injection material, a gap is not generated between the injection frame 250 and the window 210.

In particular, since the injection frame 250 is formed in a manner of enclosing the lateral side of the window 210 by the insert injection molding, if the injection frame 250 is externally viewed, it looks as if the window 210 and the injection frame 250 are continuously and smoothly connected to each other on a same plane.

Since no gap is generated between the window 210 and the injection frame 250, the adhesive agent A for attaching the window 210 and the metal frame 230 together is not externally seen. Therefore, it is able to enhance the beauty of the exterior of the mobile terminal 100.

Moreover, when the injection material in a liquid state is cooled and solidified in the course of the inset injection molding of the injection frame 250, the injection frame 250 holds the window 210 and the metal frame 230 firmly to reinforce the locking power between the injection frame 250 and the window 210.

Meanwhile, referring to FIG. 5, the metal frame 230 preferably includes an accommodating part 231 for accommodating a portion of an injection material for forming the injection frame 250 therein.

FIG. 5 shows that the metal frame 230 is bent twice in its width direction to have a shape of '⊏'. In particular, the metal frame 230 is constructed with a top plate portion, a vertical portion and a bottom portion. And, the accommodating part 231 is formed between the top plate portion and the bottom plate portion. In the course of the insert injection molding process of the injection frame 250, after the melted injection member has been accommodated in the above configured accommodating unit 231, the accommodating part 231 plays a role in enabling the injection member in the liquid state, of which state is changed into a solid state from the liquid state, to firmly hold inner and outer surroundings of the accommodating part 231. Namely, if the liquid injection member accommodated in the accommodating part 231 of the metal frame 230 and the injection member flowing around the top and bottom plate portions of the metal frame 230 are simultaneously solidified, the solid state injection material is formed while a power of holding the top and bottom plate portions of the metal frame 230 is working.

Therefore, the metal frame 230 provides a bending strength by being attached to the backside of the window 210. If the metal frame 230 is configured to have the accommodating part 231 for accommodating the injection material partially therein, the injection frame 250 and the metal frame 230 are more strongly locked with each other. As the injection frame 250 and the metal frame 230 are strongly locked with each other, the locking power between the window 210 having the metal frame 230 attached thereto and the injection frame 250 is considerably enhanced while the window 210 is enclosed by the injection frame 250.

In the following description, various shapes of the metal frame 230 having the accommodating part 231 are explained.

Figure 6:
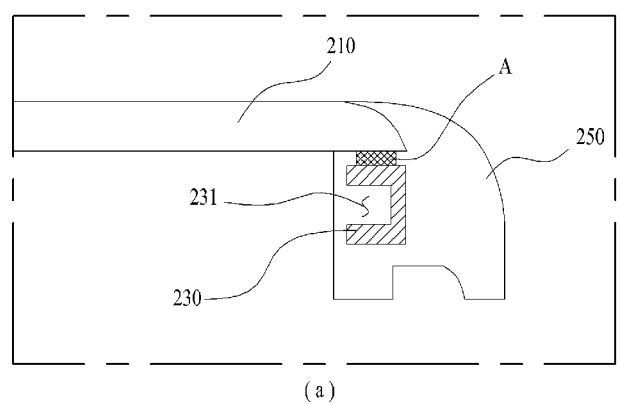
FIGS. 6(a)-6(b) are partially cross-sectional diagrams of a mobile terminal according to another embodiment of the present invention.
Figure 6:
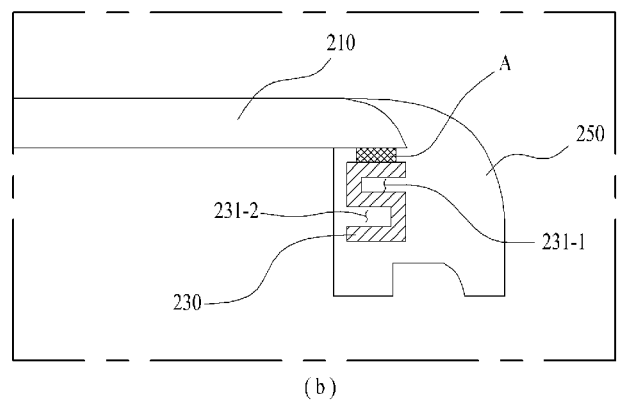

FIG. 6 is a partially cross-sectional diagram of a mobile terminal according to another embodiment of the present invention.

Referring to FIG. 6 (a), a metal frame 230 has a mirror image shape of the shape '⌐' of the former metal frame shown in FIG. 5.

Referring to FIG. 6 (b), a metal frame 230 is bent four times in its width direction by changing a bending direction in the middle to form a shape similar to 'S'. Thus, if the above configured metal frame 230 is formed, two accommodating parts 231-1 and 231-2 can be formed to accommodate an injection material therein. Therefore, the locking power can be further enhanced.

Figure 7:
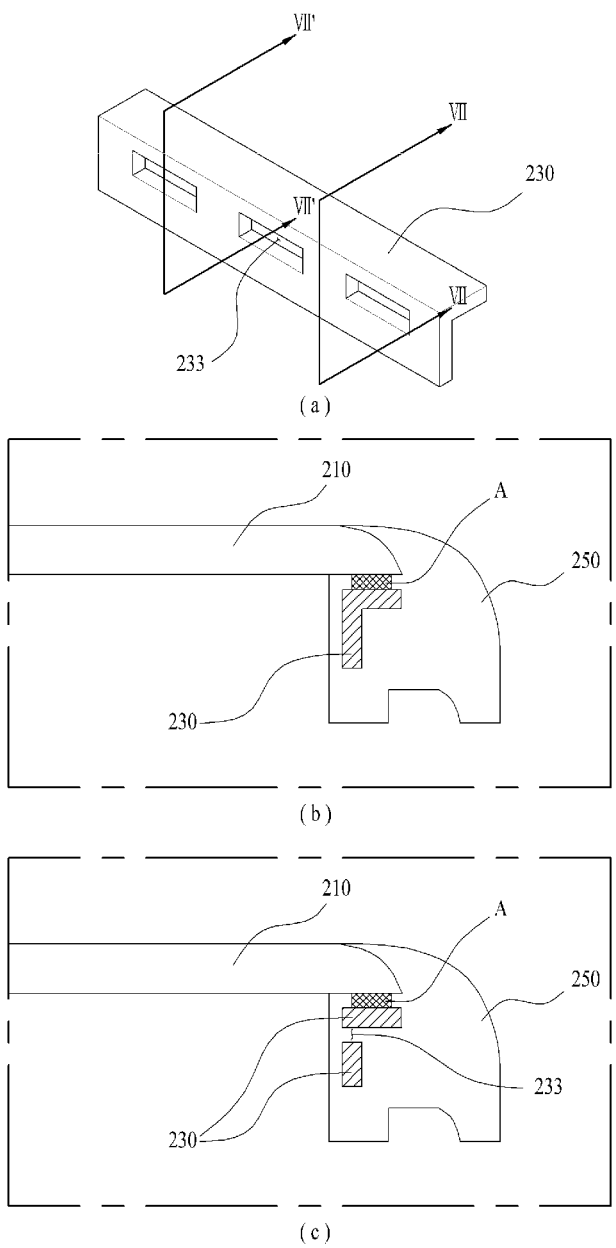
FIGS. 7(a)-7(c) are perspective diagrams of a metal frame included in a mobile terminal according to another embodiment of the present invention, in which partially cross-sectional diagrams of the mobile terminal including the metal frame are included.

FIG. 7 is a perspective diagram of a metal frame included in a mobile terminal according to another embodiment of the present invention, in which partially cross-sectional diagrams of the mobile terminal including the metal frame are included.

FIG. 7 (a) is a perspective diagram of a metal frame 230 according to the present embodiment.

Referring to FIG. 7 (a), a metal frame 230 according to the present embodiment is bent once in its width direction to have a shape similar to '⌐'.

Thus, if the metal frame 230 is formed by being bent once, its fabrication is easier than former fabrication of bending the metal frame at least twice. Therefore, it is advantageous in mass productivity. On the contrary, since the accommodating part 231 shown in FIG. 5 and FIG. 6 is not formed, the corresponding locking power may be smaller than the locking power of the former embodiment shown in FIG. 5 and FIG. 6.

Therefore, at least one fixing hole 233 can be provided to the metal frame 230 of the present embodiment to be penetrated by a portion of an injection material forming an injection frame 250.

Referring to FIG. 7 (a), a plurality of the fixing holes 233 are formed on the metal frame 230 by being spaced from each other in a length direction of the metal frame 230. And, each of the fixing holes 233 has an approximately rectangular shape, by which the present embodiment is non-limited. Alternatively, a configured direction of the fixing hole 233, a shape of the fixing hole 233, the number of the fixing holes 233 and the like can be modified in various ways.

Moreover, the fixing holes 233 shown in FIG. 7 (a) are formed by perforating the metal frame 230.

FIG. 7 (b) is a cross-sectional diagram of the metal frame 230 and the window 210 bisected along a cutting line VII-VII shown in FIG. 7 (a) and also shows a configuration that the metal frame 230 shown in FIG. 7 (a) is attached to the window 210.

Referring to FIG. 7 (b), a metal frame 230 according to the present embodiment is formed by being bent once to have a shape of '⌐' to facilitate its mass productivity.

Referring to FIG. 7 (c), since a portion of the injection material forming an injection frame 250 is configured to penetrate the fixing hole 233, it is able to provide a strong locking power. In particular, as the injection material in the solid state is formed in a manner that the injection member in a liquid state, which passes through a fixing hole 233 of a metal frame 230, is solidified in the course of the insert injection molding process of the injection frame 230 while a power of holding outer and inner parts of the fixing hole 233 is working, the injection frame 250 is strongly locked with the metal frame 230. Therefore, the injection frame 250 is firmly fixed to the window 210.

Moreover, since the fixing hole 233 can be simply formed by perforating the metal frame 230, mass production is facilitated.

Figure 8:
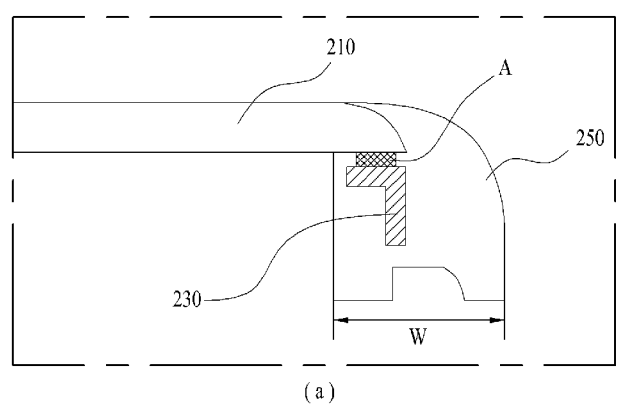
FIGS. 8(a)-8(b) are partially cross-sectional diagrams of a mobile terminal according to another embodiment of the present invention.
Figure 8:
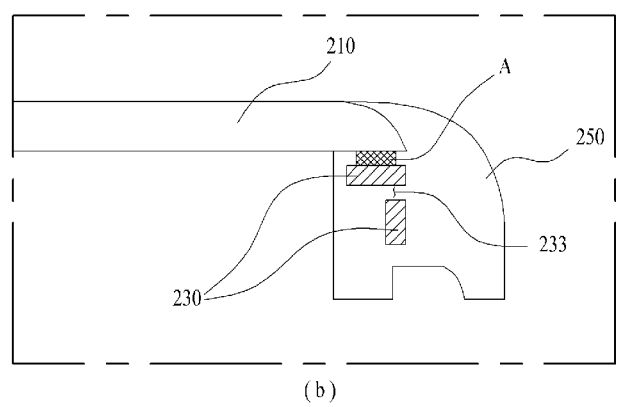

FIG. 8 is a partially cross-sectional diagram of a mobile terminal according to another embodiment of the present invention.

As metal frame 230 according to the present embodiment is almost identical to the former metal frame shown in FIG. 7 but differs from the former metal frame in having a cross-section of a shape similar to '⌐', a perspective diagram is not shown in the drawing.

FIG. 8 (a) and FIG. 8 (b) correspond to FIG. 7 (b) and FIG. 7 (c), respectively. Namely, FIG. 8 (a) shows a cross-section of bisecting a metal frame 230 including a portion at which a perforated hole 233 is not formed. And, FIG. 8 (b) shows a cross-section of bisecting a metal frame 230 including a portion at which a perforated hole 233 is formed.

Referring to FIG. 8 (a), when a '⌐' shaped metal frame 230 is attached to a window 210, it is able to considerably reduce a width W of an injection frame 250. If the injection frame 250 is a case configured to form an exterior of the mobile terminal 100, implementation of a narrow bezel part is facilitated. Compared to a structure that a metal frame 230 is configured to be projected toward an injection frame 250, since a vertical portion of the metal frame 230 is formed in a direction of forming the injection frame 250, a space margin of the width of the injection frame 250 needs not to be taken into consideration.

Referring to FIG. 8 (b), the metal frame 230 according to the present embodiment can have a fixing hole 233 configured to enable a portion of an injection material forming the injection frame 250 to pass through the fixing hole 233. Therefore, it is able to provide a strong locking power among the window 210, the metal frame 230 and the injection frame 250.

Figure 9:
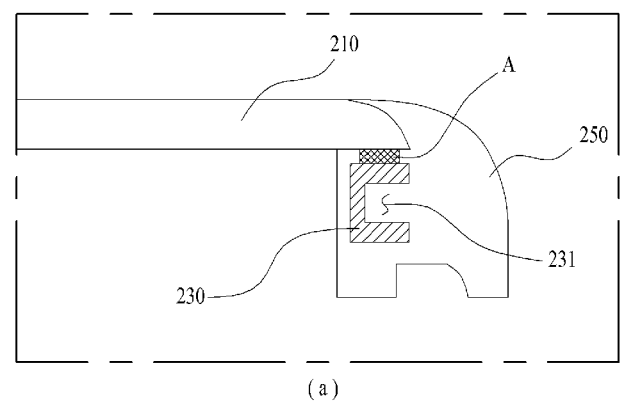
FIGS. 9(a)-9(b) are partially cross-sectional diagrams of a mobile terminal according to another embodiment of the present invention.
Figure 9:
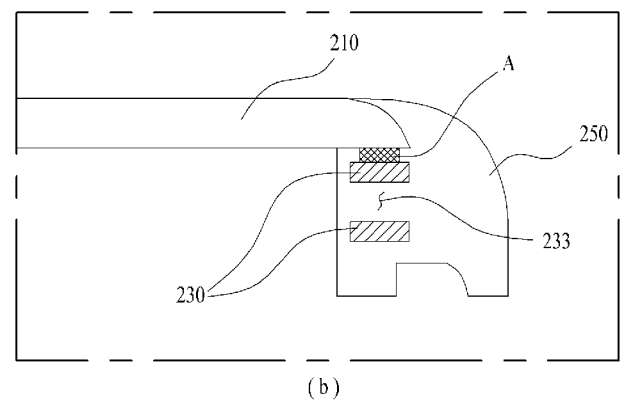

FIG. 9 is a partially cross-sectional diagram of a mobile terminal according to another embodiment of the present invention.

As metal frame 230 according to the present embodiment is almost identical to the former metal frame shown in FIG. 7 but differs from the former metal frame in having a cross-section of a shape similar to '⌐', a perspective diagram is not shown in the drawing.

FIG. 9 (a) and FIG. 9 (b) correspond to FIG. 7 (b) and FIG. 7 (c), respectively. Namely, FIG. 9 (a) shows a cross-section of bisecting a metal frame 230 including a portion at which a perforated hole 233 is not formed. And, FIG. 9 (b) shows a cross-section of bisecting a metal frame 230 including a portion at which a perforated hole 233 is formed.

Referring to FIG. 9 (a), a metal frame 230 includes an accommodating part 231 configured to accommodate a portion of an injection material forming an injection frame 250, like the former metal frame shown in FIG. 5. Therefore, it is able to provide a strong locking power among the window 210, the metal frame 230 and the injection frame 250.

Referring to FIG. 9 (b), since a fixing hole 233 is further provided to the metal frame 230 of the present embodiment to enable a portion of the injection material forming the injection frame 250 to pass through, it is able to provide a stronger locking power.

Figure 10:
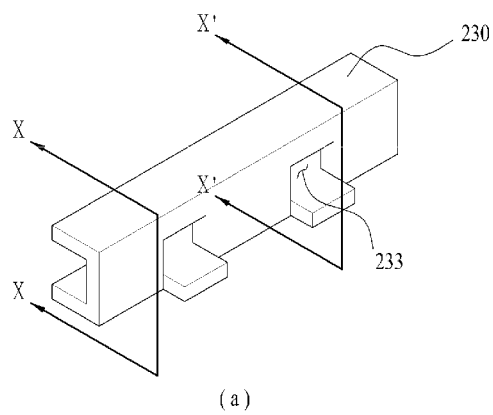
FIGS. 10(a)-10(c) are perspective diagrams of a metal frame included in a mobile terminal according to another embodiment of the present invention, in which partially cross-sectional diagrams of the mobile terminal including the metal frame are included.
Figure 10:
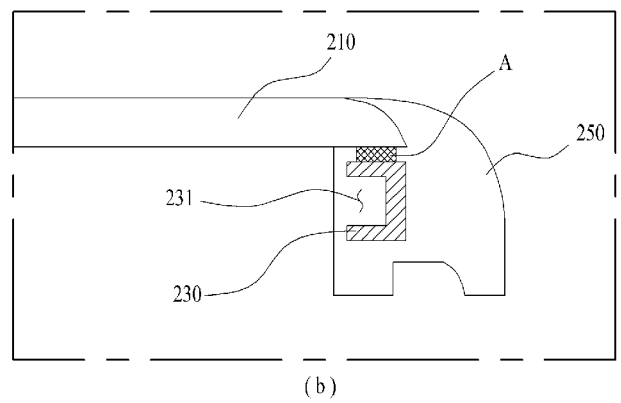
Figure 10:
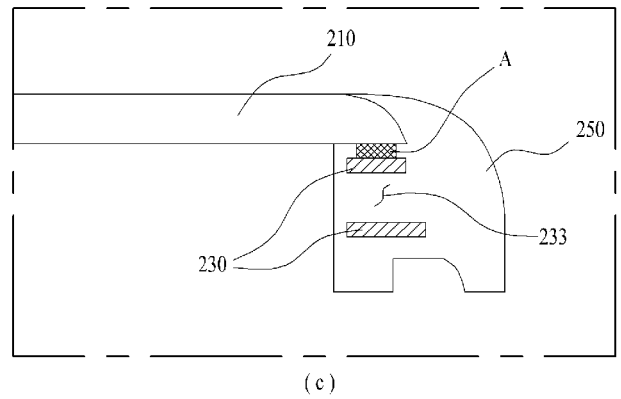

FIG. 10 is a perspective diagram of a metal frame included in a mobile terminal according to another embodiment of the present invention, in which partially cross-sectional diagrams of the mobile terminal including the metal frame are included.

Referring to FIG. 10 (a), although the fixing hole in one of the former embodiments shown in FIGS. 7 to 9 is formed by perforating the metal frame, a fixing hole 233 of the present embodiment is formed in a manner of cutting at least one portion of a metal frame 230.

In particular, FIG. 10 (a) shows the metal frame 230 having a mirror image shape of '⊏', in which a vertical portion of the metal frame 230 is partially cut and bent in a direction opposing a bottom plate portion of the metal frame 230.

FIG. 10 (b) is a cross-sectional diagram according to a cutting line X-X shown in FIG. 10 (a) and shows that the metal frame 230 shown in FIG. 10 (a) is attached to the window 210. FIG. 10 (c) is a cross-sectional diagram according to a cutting line X'-X' shown in FIG. 10 (a) and shows that the metal frame 230 shown in FIG. 10 (a) is attached to the window 210.

Referring to FIG. 10 (b), since a metal frame 230 includes an accommodating part 231 configured to accommodate a portion of an injection material forming an injection frame 250, it is able to provide a strong locking power among the window 210, the metal frame 230 and the injection frame 250.

Referring to FIG. 10 (c), since a fixing hole 233 is further provided to the metal frame 230 of the present embodiment to enable a portion of the injection material forming the injection frame 250 to pass through, it is able to provide a stronger locking power.

In the above descriptions, so far, the embodiments of forming the injection frame by the insert injection molding are explained with reference to FIGS. 5 to 10. In the following description, embodiments of another type shall be described.

Figure 11:
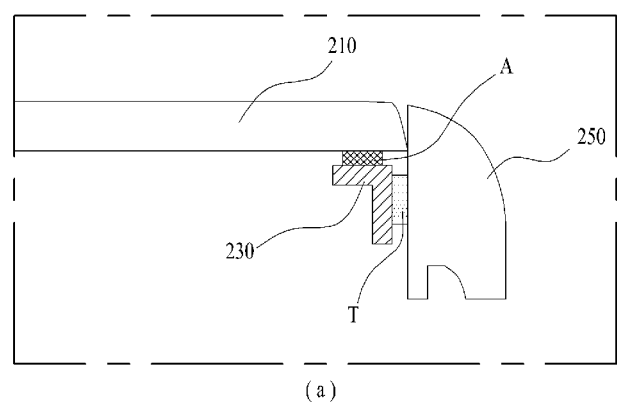
Figure 11:
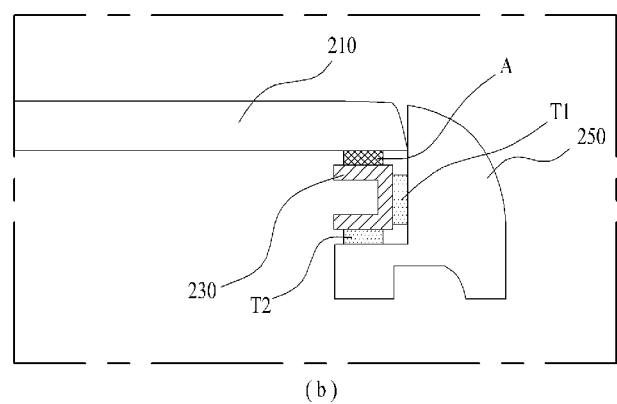

FIG. 11 is a partially cross-sectional diagram of a mobile terminal according to another embodiment of the present invention.

Referring to FIG. 11, a mobile terminal according to the present invention includes an injection frame 250 combined with a lateral side of a window 210 and a metal frame 230 at least. In this case, the injection frame 250 can be attached to the metal frame 230 using an adhesive table T.

Thus, in attaching the injection frame 250 and the metal frame 230 together, if the adhesive tape T is used, it facilitates the corresponding assembly work to enable a manufacturing process to proceed fast.

In this case, unlike the former embodiment, the injection frame 250 is formed for the window 210 not by the insert injection molding but by a general injection molding method.

FIG. 11 (a) shows that the metal frame 230 is bent once in a width direction to have a shape similar to '⌐'. And, a vertical portion of the metal frame 230 and the injection frame 250 are attached to each other using the adhesive tape T.

FIG. 11 (b) shows that the metal frame 230 is bent twice to have a shape similar to a mirror image shape of '⊏'. A vertical portion of the metal frame 230 and the injection frame 250 are attached to each other using an adhesive tape T1, while a bottom plate portion of the metal frame 230 and the injection frame 250 are attached to each other using an adhesive tape T2.

Figure 12:
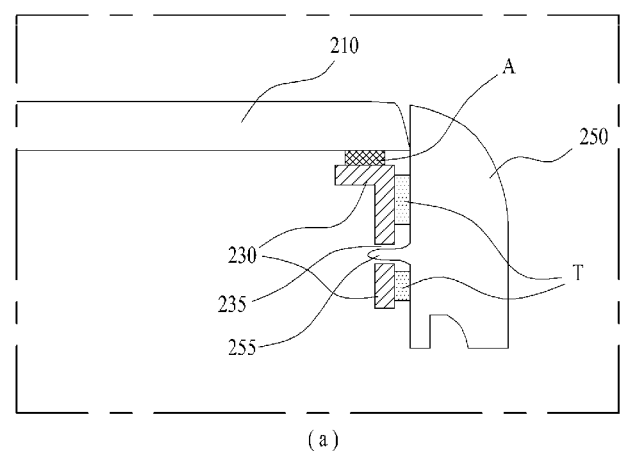
FIGS. 12(a)-12(b) are partially cross-sectional diagrams of a mobile terminal according to another embodiment of the present invention.
Figure 12:
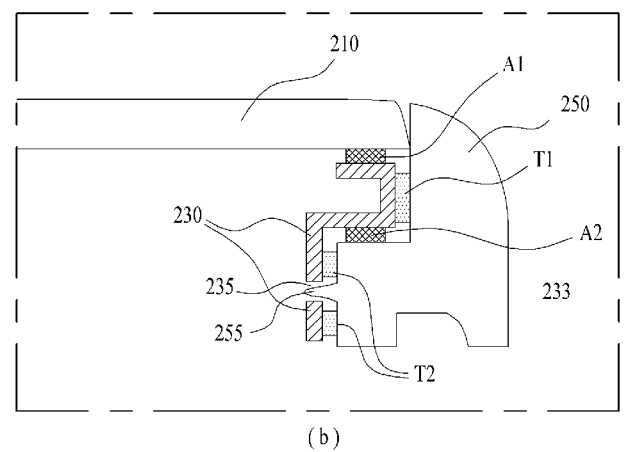

FIG. 12 is a partially cross-sectional diagram of a mobile terminal according to another embodiment of the present invention.

Referring to FIG. 12, a ring type projection 255, which is configured in a manner of being projected toward a metal frame 230, is provided to an injection frame 250. And, a locking hole 235 can be provided to the metal frame 230 to have the projection 255 locked therein.

At least one projection 255 and at least one locking hole 235 can be provided. And, FIG. 12 shows a cross-section of combining the projection 255 and the locking hole 235 together. Hence, a perspective diagram of the metal frame 230 according to the present embodiment is omitted from FIG. 12. Yet, a plurality of locking holes 235 similar to those of the former metal frame shown in FIG. 7 (a) can be provided in a manner of being spaced apart from each other.

Referring to FIG. 12 (a), a top plate portion of the metal frame 230 is attached to a window 210 using an adhesive agent A, while a vertical portion of the metal frame 230 is attached to an injection frame 250 using an adhesive tape T. A ring type projection 255 projected from the injection frame 250 toward the metal frame 230 is inserted and fixed to a locking hole 235 provided to a vertical portion of the metal frame 230.

Thus, besides the attachment by the adhesive tape T, the projection 255 of the injection frame 250 and the locking hole 235 of the metal frame 230 are locked and fixed thereto. Therefore, it is able to provide a stronger locking power between the injection frame 250 and the metal frame 230.

FIG. 12 (b) shows another embodiment. Referring to FIG. 12 (b), a metal frame 230 of the present embodiment is bent three times in a width direction and has a locking hole 230 provided to its lower part. And, a projection 255 is provided to an injection frame 250 to be inserted in and fixed to the locking hole 235.

According to the present embodiment, unlike the former embodiment shown in FIG. 12 (a), in attaching the metal frame 230 and the injection frame 250 to each other, adhesive tapes T1 and T2 and an adhesive agent A2 are used. Thus, using the adhesive agent A2, it is able to use an attaching method different to a manufacturing process. Moreover, as such an attaching means as an adhesive tape, an adhesive agent and the like is usable each time the metal frame 230 is bent (i.e., the attaching means are usable for various portions, respectively), a locking power can be further reinforced.

In the above descriptions, so far, the injection frame 250 is the case that configures the exterior of the mobile terminal 100 together with the window 210. In the following description, a case that an injection frame 250 is used as a different component is explained with reference to FIG. 13.

Figure 13:
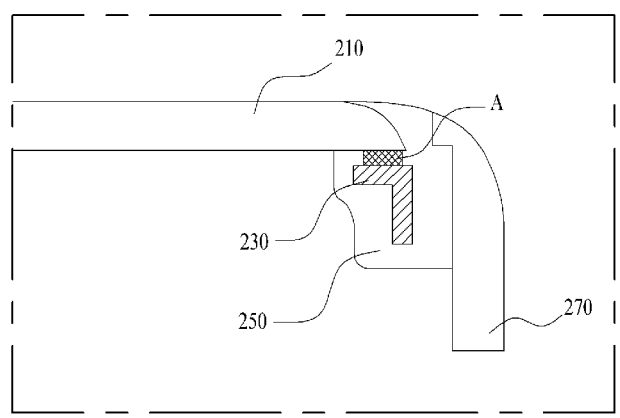
FIG. 13 is a partially cross-sectional diagrams of a mobile terminal according to another embodiment of the present invention.

FIG. 13 is a partially cross-sectional diagram of a mobile terminal according to another embodiment of the present invention.

Referring to FIG. 13, a mobile terminal according to the present invention includes an injection frame 250 combined with a lateral side of a window 210 at least and a metal frame 230 and a case 270 forming an exterior of the mobile terminal. In this case, the injection frame 250 can be provided between the window 210 and the case 270. And, the case 270 can be made of a metal material.

Recently, in order to enhance the exterior beauty of a mobile terminal, a case having a metallic touch is ongoing to be preferred. In order to the metallic touch to the case, a case is made of a plastic material and a metallic color is then coated on a surface of the case. Yet, when the painting or coating work is performed, a window should be protected from a painting material. And, it may possible that the paint is peeled off after prescribed duration. Therefore, a method of forming a case using a metal material is proposed.

In case that the case 270 is made of the metal material, when the case 270 is brought into direct contact with the window 210 made of a glass material, external shock can be directly transferred to the window 20 via the metal case 270. Therefore, it is highly possible to cause damage to the window 210.

According to the present embodiment, since the injection frame 250 is inserted between the window 210 and the case 270 made of the metal material, the shock transferred from the case 270 made of the metal material can be buffered by the injection frame 250. This is because the injection frame 250 is generally made of a plastic material or such a good shock-absorbing material as a ceramic and the like.

Moreover, referring to FIG. 13, since the injection frame 250 of the present embodiment is formed by the insert injection molding, no gap with the window 210 is generated in-between.

In the following description, attachment between a window 210 and a metal frame 230 via an adhesive agent A is explained in detail.

Figure 14:
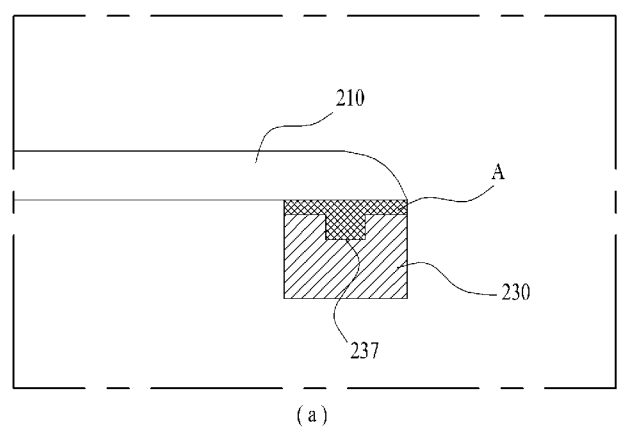
FIGS. 14(a)-14(b) are partially cross-sectional diagrams of a mobile terminal according to another embodiment of the present invention.
Figure 14:
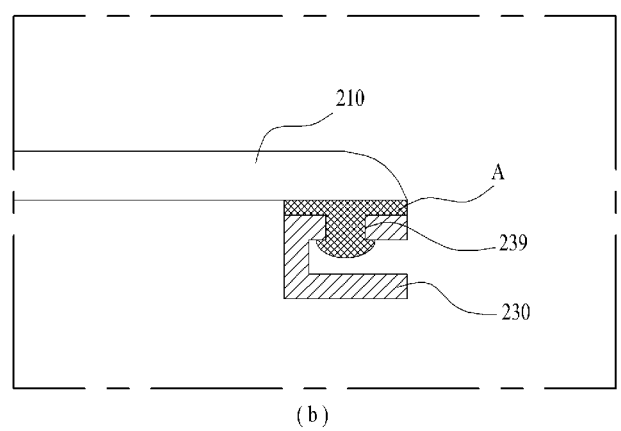

FIG. 14 is a partially cross-sectional diagram of a mobile terminal according to another embodiment of the present invention. For clarity of the following description, an injection frame is not shown in FIG. 14.

Referring to FIG. 14, a metal frame 230 according to the present embodiment is attached to an edge of a backside of a window 210 using an adhesive agent A.

In this case, the adhesive agent A means a substance that is not broken instead of being detached after being coated and solidified on an attachment region in a liquid state. The adhesive agent is normally formed of polymers. In particular, the adhesive agent uses polymers in a liquid state. Alternatively, the adhesive agent uses polymers due to polymerization after low molecules in liquid phase have been bonded together. Alternatively, the agent is used in a manner of melting solid polymers to attach something.

Meanwhile, referring to FIG. 14 (a), a recess 237 in a prescribed depth can be formed on one surface of the metal frame 230 attached to the window 210.

FIG. 14 (a) shows that the recess 237 is formed on a topside of the metal frame 230 that is attached to the window 210. Thus, if the recess 237 is formed on the surface on which the agent A is coated, the adhesive agent A flows on the attached surface of the metal frame 230 and further flows into the recess 237. Since the adhesive agent A is coated on all over the inner surfaces of the recess 237, a coated area of the adhesive agent A is increased. Therefore, a locking power between the window 210 and the metal frame 230 is further increased.

Referring to FIG. 14 (b), a perforated hole 239 can be provided to one surface of a metal frame 230 attached to a window 210.

If the perforated hole 239 is formed on a surface coated with an adhesive agent A, the adhesive agent A is coated by penetrating the perforated hole 239, as shown in FIG. 14 (b), and is further coated on a predetermined range of a periphery of the perforated hole 239. Thus, if the perorated hole 239 is provided to the metal frame 230, an area coated with the adhesive agent A is increased to reinforce a locking power between the window 210 and the metal frame 230.

Figure 15:
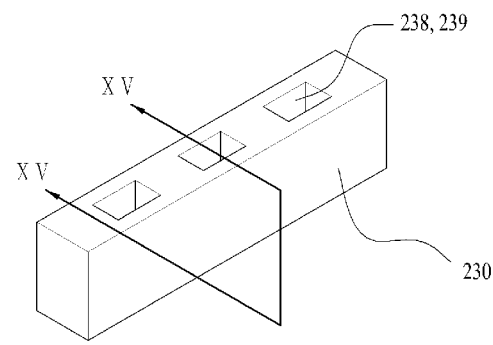
FIGS. 15(a)-15(b) are perspective diagrams of a metal frame included in a mobile terminal according to a further embodiment of the present invention, in which partially cross-sectional diagrams of the mobile terminal including the metal frame are included.
Figure 15:
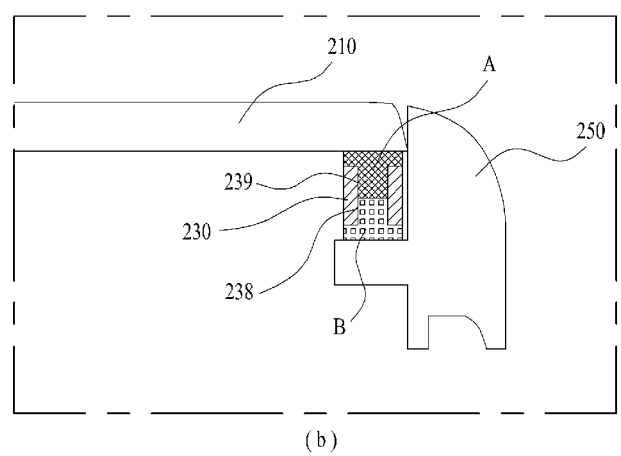

FIG. 15 is a perspective diagram of a metal frame included in a mobile terminal according to a further embodiment of the present invention, in which partially cross-sectional diagrams of the mobile terminal including the metal frame are included.

In particular, FIG. 15 (a) is a perspective diagram of a metal frame 2300 according to another embodiment, FIG. 15 (b) shows a state that the metal frame 230 shown in FIG. 15 (a) is attached to a window 210, and FIG. 15 (c) is a cross-sectional diagram along a cutting line XV-XV shown in FIG. 15 (a).

Referring to FIG. 15 (a), at least one or more perforated holes 238 and 23 are provided to one face of a metal frame 230 according to the present embodiment. In this case, since a cross-section of the metal frame 230 is formed rectangular approximately, it facilitates a manufacturing process.

Referring to FIG. 15 (b), the perforated hole 238 can be provided to one face of the metal frame 230 attached to an injection frame 250. According to the present embodiment, since the metal frame 230 has the rectangular cross-section, the perforated hole 238 extends to one face of the metal frame 230 attached to the window 210. In particular, the perforated hole 239 provided to the one face of the metal frame 230 attached to the window 210 is identical to the perforated hole 238 provided to the one face of the metal frame 230 attached to the injection frame 250. Of course, if the metal frame 230 is formed to have shape similar to '⊏', as shown in FIG. 14 (b), the perforated hole 239 provided to the one face of the metal frame 230 attached to the window 210 can be different from the perforated hole 238 provided to the one face of the metal frame 230 attached to the injection frame 250.

The mobile terminal shown in FIG. 15 (b) is manufactured in a manner of attaching the window 210 and the metal frame 230 to each other using an adhesive agent A and then attaching the metal frame 230 and the injection frame 250 to each other using an adhesive agent B. The effect of increasing the area coated with the adhesive agent B by forming the perforated hole 238 is redundant with the former description with reference to FIG. 14 and its description is omitted.

Thus, by providing the perforated hole 238 to one face of the metal frame 230 attached to the injection frame 250 and attaching the injection frame 250 and the metal frame 230 to each other using the adhesive agent B, it is able to provide a strong locking power.

Meanwhile, like the former description with reference to FIG. 14 (a), a recess (not shown in the drawing) to a prescribed depth is provided to the one face of the metal frame 230 attached to the injection frame 250 to enhance the locking power.

In the following description, various arrangements for attaching a metal frame 230 to a window 210 are explained with reference to FIG. 16 and FIG. 17.

Figure 16:
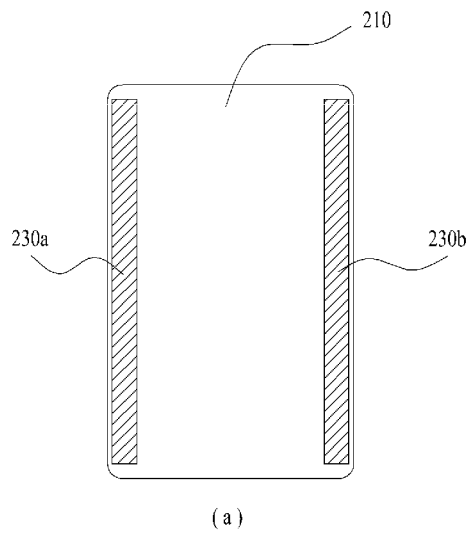
FIGS. 16(a)-16(b) are bottom view diagrams of a window of a mobile terminal and a metal frame attached to the window according to one embodiment of the present invention.
Figure 16:
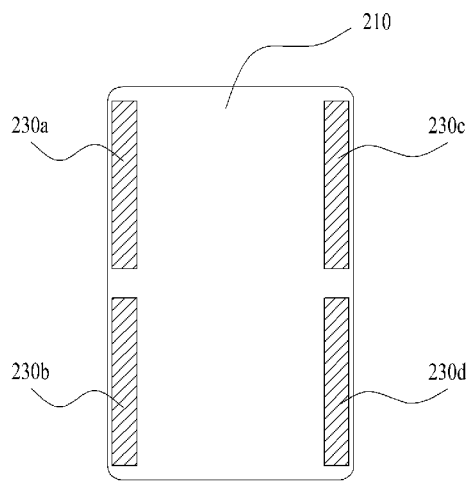

FIG. 16 is a bottom view diagram of a window of a mobile terminal and a metal frame attached to the window according to one embodiment of the present invention. For clarity of the following description, components except a window 210 and a metal frame 230 are omitted from the drawing.

Referring to FIG. 16, a plurality of metal frames 230 are provided. And, a plurality of the metal frames 230 can be attached to left and right edges of a backside of a window 210.

In case that the window 210 is made of a tempered glass material, a stress on a surface of the tempered glass and a stress in the tempered glass are generated to maintain a balance in-between. If an external force over a bending strength of the tempered glass is applied to the window 210, as mentioned in the foregoing description, it is highly possible that the window 210 can be shattered into pieces. Therefore, in case of using the tempered glass as a material of the window 210, it is necessary to secure more bending strength for the safety and durability enhancement.

According to the present embodiment, in order to secure the rigidity against a bending moment working on the window 210, a metal frame 230 is attached to an edge of a backside of the window 210. Every metal is available for a material of the metal frame 230 to provide a predetermined strength. Preferably, the metal frame 230 is made of a stainless steel material.

Referring to FIG. 16 (a), a pair of metal frames 230a and 230b corresponding to a vertical length of the window 230 can be attached to left and right edges of the backside of the window 210, respectively.

Since a vertical length of the mobile terminal 100 shown in FIG. 2 is generally greater than a horizontal length thereof, if a bending moment of the same size is applied, a bending displacement in the vertical direction can be greater than the other. In this case, if a pair of the metal frames 230a and 230b corresponding to the vertical length of the window 210 are attached to the left and right edges of the window 210, respectively, as shown in FIG. 16 (a), it is able to increase the bending strength in the vertical direction.

Besides, the metal frames can be attached in a manner of being spaced apart from each other along the length direction of the window with a predetermined gap.

In particular, according to the embodiment shown in FIG. 16 (b), 4 metal frames 230a, 230b, 230c and 230d are attached to the left and right edges of the window 210 in a manner of being spaced apart from each other along the length direction of the window 210 with a predetermined gap.

Preferably, one set of the metal frames 230a and 230c and the other set of the metal frames 230b and 230d are attached to the left and right edges, as shown in the drawing, to oppose each other, respectively. Therefore, the present embodiment is able to secure the uniform bending strength.

Compared to the former embodiment shown in FIG. 16 (a), the present embodiment reduces total weight of the metal frames 230, thereby designing a lighter mobile terminal.

Figure 17:
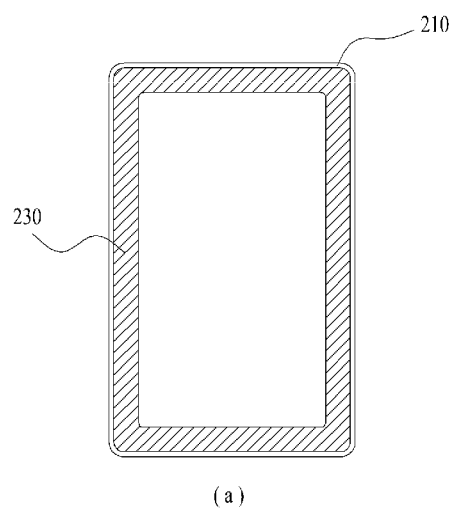
FIGS. 17(a)-17(b) are bottom view diagrams of a window of a mobile terminal and a metal frame attached to the window according to another embodiment of the present invention.
Figure 17:
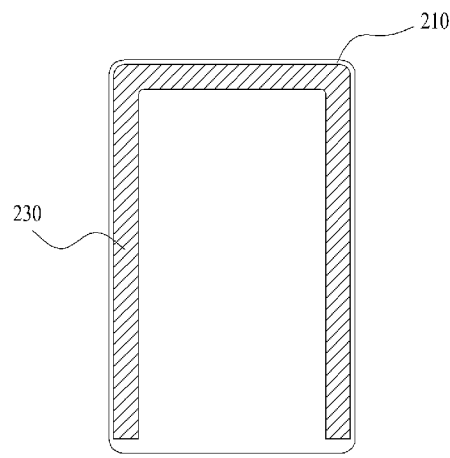

FIG. 17 is a bottom view diagram of a window of a mobile terminal and a metal frame attached to the window according to another embodiment of the present invention.

Referring to FIG. 17, a metal frame 230 according to the present embodiment has a shape configured in a manner of being bent along an edge of a window 210.

In particular, FIG. 17 (a) shows a metal frame 230 having a closed-loop shape.

Recently, since a thickness of the window 210 applied to the mobile terminal 100 shown in FIG. 2 is ongoing to decrease, such a problem as a transformation due to a bending moment, a damage caused by the bending moment and the like is frequently caused in a horizontal direction of the window 210 as well as a vertical direction.

Therefore, the metal frame 230 of a closed-loop shape is formed along the edge of the window 210 and is then attached to the window 210. If so, it is able to secure a high bending strength in all directions of the window 210.

Meanwhile, it is necessary to secure a predetermined bending strength for the window 210 by reducing a weight of a mobile terminal in a manner of decreasing a weight of the metal frame 230. For this, referring to FIG. 17 (b), the metal frame 230 shown in FIG. 17 (a) is partially opened and is then attached to the window 210.

Figure 18:
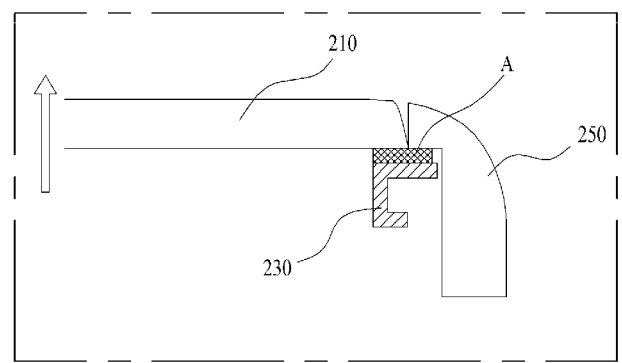
FIG. 18 is a partially cross-sectional diagram of a mobile terminal according to a further embodiment of the present invention.

FIG. 18 is a partially cross-sectional diagram of a mobile terminal according to a further embodiment of the present invention.

Referring to FIG. 18, a mobile terminal according to the present embodiment is characterized in that one end of a metal frame 230 is projected outside one side of a window 210.

Unless the insert injection molding is performed on the injection frame 250 to build in one body of the window 210 and the metal frame 230, as shown in FIGS. 5 to 10, it is able to assemble the window in an arrow direction shown in FIG. 18. Therefore, if a means for restricting a motion toward an upper direction of the window 210 is not provided, it may be inconvenient to perform the assembly work.

For this, referring to FIG. 18, a metal frame 230 according to the present embodiment is attached to a backside of the window 210 in a manner that its one end is projected outside a lateral side of the window 210, and more particularly, toward the injection frame 250. Therefore, even if the window 210 is assembled in the arrow direction shown in FIG. 18, it is caught by the one end of the injection frame 250. Thus, if the one end of the injection frame 250 projected outside the window 210 is caught by the projection frame 250, an upward motion of the window 210 is restricted to facilitate the assembly work to be completed.

Moreover, when the metal frame 230 and the window 210 are attached to each other using an adhesive agent A, even if a considerably amount of the adhesive agent A is unintentionally used, the adhesive agent A is coated by spreading toward one end of the metal frame 230 projected outside the window 210 only but does not leak through a gap between the injection frame 250 and the window 210. Therefore, the attaching work can be neatly completed.

Figure 19:
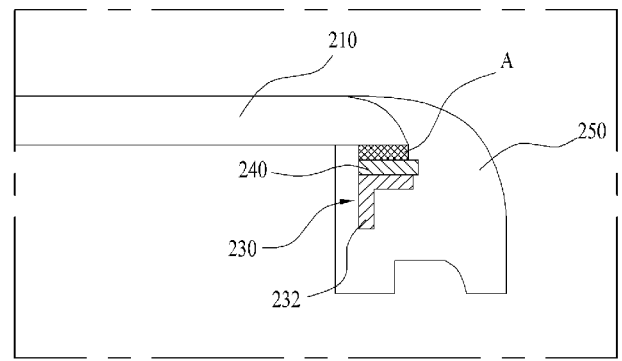
FIG. 19 is a partially cross-sectional diagram of a mobile terminal according to another further embodiment of the present invention.

FIG. 19 is a partially cross-sectional diagram of a mobile terminal according to another further embodiment of the present invention.

Referring to FIG. 19, a metal frame 230 can have a bent part 232 that is bent at least once in a width direction. By providing the above-configured bent part 232, the metal frame 230 can be formed in one of various shapes for the corresponding purpose. For instance, if the bent part 232 is formed in a shape similar to 'ㄱ', as shown in FIG. 19, a space margin amounting to a space formed by the bent part 232 and a top plate portion of the metal frame 230 is generated to raise the degree of freedom for a shape transformation of the injection frame 250. Meanwhile, if the metal frame 230 is formed in a shape similar to 'ㄷ', as shown in FIG. 5, it is able to provide the accommodating part 231 shown in FIG. 5. Therefore, as mentioned in the foregoing description, it is able to reinforce the locking power.

Thus, in case of attempting to provide a further enhanced bending strength to the metal frame 230 having the bent part 232, a reinforcing frame 240 can be further provided to the topside of the metal frame 230. If the rigidity is secured not by providing the reinforcing frame 240 but by increasing a thickness of the metal frame 230, the thick metal frame 230 needs to be bent to form the bent part 232, which is not easy to perform.

Therefore, in the mobile terminal according to the present embodiment, at least one layer of the reinforcing frame 240, which is made of the same metal of the metal frame 230, is stacked on the metal frame 230 bent at least once in the width direction. The topside of the reinforcing frame 240 and an edge of a backside of the window 210 can be attached together using an adhesive agent A.

As mentioned in the above description, if the reinforcing frame 240 is added, it is able to secure higher rigidity.

Meanwhile, in order to reinforce an adhesive power, at least one of the recess 237 to the prescribed depth, the perforated hole 239 and the like, as shown in FIG. 14, can be further provided to the reinforcing frame 240 as well.

Accordingly, the present invention provides the following effects and/or advantages.

First of all, since a metal frame is attached to an edge of a backside of a window in a mobile terminal according to the present invention, it is able to sufficiently secure a rigidity for a bending moment.

Secondly, a window and a bezel part can be strongly locked with each other despite a narrow bezel part.

Thirdly, since a window, a metal frame and a bezel part are formed in one body by insert injection molding, there is no gap between the window and the bezel part. Therefore, the present invention enhances the exterior beauty of the mobile terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
    a display unit configured to display data;
    a window positioned over the display unit, the window comprising an optically transmittive material;
    at least one bent metal frame comprising a top plate portion coupled to an edge portion of a backside of the window and an accommodating part formed by at least two bends of the at least one bent metal frame; and
    a plastic frame combined via insert injection molding with a lateral side of the window and the at least one bent metal frame into a monolithic body,
    wherein the plastic frame forms a first part of an exterior of the mobile terminal,
    wherein the at least one bent metal frame is at least partially embedded within the plastic frame and is not exposed to an exterior of the mobile terminal, and
    wherein the accommodating part is configured to accommodate a portion of an injection molding material forming the plastic frame.

2. The mobile terminal of claim 1, wherein:
    the at least one bent metal frame further comprises at least one fixing hole in a portion bent away from the top plate portion; and
    a portion of the injection molding material forming the plastic frame is formed by penetrating the at least one fixing hole during the insert injection molding.

3. The mobile terminal of claim 1, further comprising:
    a case comprising a metal material and configured to form a second part of the exterior of the mobile terminal,
    wherein the plastic frame is positioned between the window and the case.

4. The mobile terminal of claim 1, wherein the top plate portion of the at least one bent metal frame is attached to the edge portion of the backside of the window via an adhesive agent.

5. The mobile terminal of claim 4, wherein at least one recess having a predetermined depth is formed in the top plate portion of the at least one bent metal frame.

6. The mobile terminal of claim 4, wherein at least one perforated hole is formed in the top plate portion of the at least one bent metal frame.

7. The mobile terminal of claim 1, wherein the at least one bent metal frame further comprises a plurality of metal frames configured to be attached to left and right edges of the backside of the window.

8. The mobile terminal of claim 1, wherein the bend of the at least one bent metal frame is positioned along the edge portion of the window.

9. The mobile terminal of claim 1, wherein the top plate portion of the at least one bent metal frame projects outside one side of the window.

10. The mobile terminal of claim 1, further comprising:
    a reinforcing frame made of a same metal as the at least one bent metal frame, at least one layer of the reinforcing frame stacked on the top plate portion of the at least one bent metal frame,
    wherein a topside of the reinforcing frame and the edge portion of the backside of the window are attached to each other via an adhesive agent.

11. A mobile terminal, comprising:
    a window comprising an optically transmittive material;
    at least one bent metal frame comprising a top plate portion coupled to a backside of the window and not exposed to an exterior of the mobile terminal; and
    a plastic frame attached to the at least one bent metal frame via an adhesive tape and coupled to a lateral side of the window, the plastic frame forming part of an exterior of the mobile terminal and comprising a ring-type projection projecting toward the at least one bent metal frame,
    wherein the at least one bent metal frame further comprises a locking hole configured to receive the projection of the plastic frame in a locking arrangement.

12. The mobile terminal of claim 11, wherein the at least one bent metal frame further comprises at least one recess having a predetermined depth formed in a face of the at least one bent metal frame that is attached to the plastic frame.

13. The mobile terminal of claim 11, wherein the at least one bent metal frame further comprises at least one perforated hole formed in a face of the at least one bent metal frame that is attached to the plastic frame.

14. The mobile terminal of claim 11, wherein the plastic frame further comprises a case configured to form an exterior of the mobile terminal together with the window.

15. The mobile terminal of claim 11, further comprising:
    a case comprising a metal material and configured to form an exterior of the mobile terminal,
    wherein the plastic frame is positioned between the window and the case.

* * * * *